US009432983B2

(12) United States Patent
Sundberg et al.

(10) Patent No.: US 9,432,983 B2
(45) Date of Patent: Aug. 30, 2016

(54) EXTENSION OF RADIO LINK CONTROL TRANSMIT WINDOW

(71) Applicant: TELEFONAKTIEBOLAGET L M ERICSSON (PUBL), Stockholm (SE)

(72) Inventors: Mårten Sundberg, Årsta (SE); John Walter Diachina, Garner, NC (US); Eric Nordström, Stockholm (SE); Paul Schliwa-Bertling, Ljungsbro (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 152 days.

(21) Appl. No.: 14/237,969

(22) PCT Filed: Nov. 12, 2013

(86) PCT No.: PCT/SE2013/051333
§ 371 (c)(1),
(2) Date: Feb. 10, 2014

(87) PCT Pub. No.: WO2014/077764
PCT Pub. Date: May 22, 2014

(65) Prior Publication Data
US 2015/0009950 A1 Jan. 8, 2015

Related U.S. Application Data

(60) Provisional application No. 61/725,701, filed on Nov. 13, 2012.

(51) Int. Cl.
*H04W 4/00* (2009.01)
*H04W 72/04* (2009.01)
(Continued)

(52) U.S. Cl.
CPC .......... *H04W 72/042* (2013.01); *H04L 1/1642* (2013.01); *H04L 1/1671* (2013.01);H04L5/0023 (2013.01); *H04L 5/0055* (2013.01); *H04L 1/187* (2013.01); *H04L 1/1832* (2013.01); *H04W 88/02* (2013.01); *H04W 88/08* (2013.01)

(58) Field of Classification Search
USPC ....... 370/330, 328, 332, 338, 341, 343, 349, 370/389, 394, 392, 471, 478
See application file for complete search history.

(56) References Cited

U.S. PATENT DOCUMENTS

2003/0217318 A1* 11/2003 Choi ..................... H04W 24/00
714/750
2006/0034247 A1 2/2006 Gu et al.
(Continued)

FOREIGN PATENT DOCUMENTS

WO WO 2010/107374 A1 9/2010

OTHER PUBLICATIONS

International Preliminary Report on Patentability for International Application No. PCT/SE2013/051333, Mailed on Jan. 21, 2015.
(Continued)

*Primary Examiner* — Chi H Pham
*Assistant Examiner* — Alexander O Boakye
(74) *Attorney, Agent, or Firm* — Patent Portfolio Builders, PLLC

(57) ABSTRACT

The disclosure relates to a method in a base station subsystem, BSS, for transmission of radio link control, RLC, blocks in an extended sequence number space, SNS, and extended transmit window size on multiple downlink carriers. An RLC/Medium Access Control, MAC, header having a fixed number of bits comprises multiple control fields. A number of bits of the RLC/MAC header comprise a block sequence number, BSN, space, the BSN space includes at least one BSN field, each BSN field including a respective BSN. The method includes selecting one or more spare bits in the RLC/MAC header. Each RLC block is indexed with a BSN selected from a range of block indices representing an extended sequence number space and extended transmit window size, where the BSN is included in a BSN field of an expanded BSN space including the selected one or more spare bits.

12 Claims, 5 Drawing Sheets

(51) Int. Cl.
  *H04L 1/16*   (2006.01)
  *H04L 5/00*   (2006.01)
  *H04L 1/18*   (2006.01)
  *H04W 88/02*  (2009.01)
  *H04W 88/08*  (2009.01)

(56) References Cited

U.S. PATENT DOCUMENTS

2007/0058679 A1    3/2007  Pelletier et al.
2010/0011273 A1*   1/2010  Parolari ................ H04L 1/1664
                                                       714/749
2013/0121241 A1*   5/2013  Sebire .................. H04W 48/18
                                                       370/328

OTHER PUBLICATIONS

3GPP TS 44.060 V11.6.0 (Sep. 2013); 3$^{rd}$ Generation Partnership Project; "Technical Specification Group GSM/EDGE Radio Access Network;"General Packet Radio Service (GPRS); Mobile Station (MS)—Base Station System (BSS) interface; Radio Link Control/ Medium Access Control (RLC/MAC) protocol (Release 11); 630 pages.

3GPP TS 44.060 V11.2.1 (Sep. 2012); 3rd Generation Partnership Project; Technical Specification Group GSM/EDGE Radio Access Network; General Packet Radio Service (GPRS); Mobile Station (MS)—Base Station System (BSS) interface; Radio Link Control/ Medium Access Control (RLC/MAC) protocol (Release 11); 627 pages.

Notification of Transmittal of the International Search Report and the Written Opinion of the International Searching Authority, or the Declaration for International Application No. PCT/SE2013/051333, Mailed on Feb. 20, 2014.

Written Opinion of the International Searching Authority for International Application No. PCT/SE2013/051333, Mailed on Feb. 21, 2014.

Written Opinion of the International Preliminary Examining Authority for International Application No. PCT/SE2013/051333, Mailed on Oct. 23, 2014.

Office action in EP application No. 13803293.3 mailed Dec. 17, 2015.

* cited by examiner

EXTENSION OF RADIO LINK CONTROL TRANSMIT WINDOW

CROSS REFERENCE TO RELATED APPLICATION

This application is a 35 U.S.C. §371 national stage application of PCT International Application No. PCT/SE2013/051333, filed in the English language on 12 Nov. 2013, which itself claims the benefit of U.S. provisional Patent Application No. 61/725,701, filed 13 Nov. 2012, the disclosures and contents of both of which are incorporated by reference herein in their entirety.

TECHNICAL FIELD

The disclosure relates to a method of providing an extended sequence number space, SNS, and extended transmit window size, WS, to support transmission of radio link control, RLC, blocks on multiple downlink carriers. The disclosure also relates to a mobile station and base station subsystem configured transmission of radio link control, RLC, blocks on multiple downlink carriers.

BACKGROUND

With the introduction of multi-carrier operation in GSM EDGE Radio Access network, GERAN, the number of RLC blocks that can be transmitted over a given transmission time interval is increased by a factor that is equivalent to the number of carriers. This means that the transmit window size, WS, needs to be increased to accommodate an increased number of RLC blocks being put "on flight" so that a stalling condition due to the WS limitation can be avoided, i.e. a condition where no new RLC Packet Data Units, PDU, can transmitted even if available.

However, this requires also that the Block Sequence Number, BSN, space used to address the RLC blocks is consequently increased, as now more RLC blocks can be transmitted per transmission time interval, TTI, as per the increased WS.

In general, for protocols operating in Acknowledged Mode, AM, there is a need for feedback communication between the receiving to the transmitting entity. This is typically realized by indexing the blocks being transmitted using a block sequence number, BSN, wherein the receiving entity can indicate which blocks were received or not by sending an ACK/NACK, Acknowledgement/Negative Acknowledgement, back to the transmitting entity using BSN related references. To limit the range of block indices, a Sequence Number Space, SNS, size limitation is imposed. For any given SNS, a corresponding Window Size, WS, is associated which effectively establishes a maximum BSN distance between the BSN of the oldest outstanding, not yet acknowledged, block transmitted and the BSN of the next RLC block pending transmission, i.e. that has not yet been transmitted. Once this WS limitation is reached, the transmitting entity experiences stalling and will therefore not transmit any new blocks until it receives reception confirmation of the oldest outstanding block and thereby resulting in a BSN distance between the next oldest outstanding block transmission and the next RLC block pending transmission falling below the WS limitation. FIG. 1 illustrates transmit window size, WS, and Sequence Number Space, SNS, for an RLC block transmission scheme, also known as an RLC engine. In the following, sequence numbers referring to absolute BSN numbers determined by the RLC engine are denoted BSN [A-D]. RLC engine sequence numbers that are mapped to specific BSN fields in the RLC/MAC header are denoted BSN [1-4].

In GSM/EDGE the maximum WS of the RLC protocol is either 64 or 1024 depending on the feature used. GPRS uses a window size of 64 while EGPRS and EGPRS2 use a window size of 1024. The SNS for the respective features are 128 and 2048 respectively, see 3GPP TS 44.060.

The Block Sequence Number, BSN, for each RLC block transmitted is included in a header of a Radio Block. There are between 1-4 RLC blocks in a Radio Block depending on the Modulation and Coding Scheme, MCS, used. Each RLC block includes an RLC/MAC header+RLC data.

The principle of indicating which Block Sequence Numbers, BSN, that are associated with the RLC blocks carried within a Radio Block is described in 3GPP TS 44.060.

In general terms, if a too small transmitting WS is used in a given RLC block transmission scheme, i.e. an RLC engine, and the feedback from the receiving entity is not fast enough, the RLC engine can stall. Stalling implies that further transmission of new RLC blocks is stopped whenever the transmitter determines that the separation between the oldest transmitted RLC block not yet acknowledged by a receiving entity and the next RLC block pending transmission becomes larger than the window size.

Reasons for stalling can, for example, be that the feedback from the receiving end:
  is limited in size (i.e. the BSN space spanned by a given instance of feedback is too small)
  not frequent enough
  high error probability on the radio link (i.e. the feedback from the receiving entity does not reach the transmitting end).

The more RLC blocks that are transmitted per transmission time interval, TTI, the higher risk there is for stalling. Window Size 1024 used for the RLC protocol was designed for EGPRS operation where at most 2 RLC blocks per radio block could be transmitted per TTI. Since then, the specification has evolved in features supporting up to 4 RLC blocks per radio block (EGPRS2-B feature) and up to two carriers (Dual carrier downlink feature). Thus, the transmission rate of RLC blocks per TTI has quadrupled.

Currently the multicarrier downlink feature is being specified where the number of carriers will be extended to at least 4 carriers. Also, discussions are ongoing on introducing 2×2 MIMO to enable further improved spectral efficiency and increased end-user throughput. Thus, from the EGPRS single carrier that the RLC window size was designed for there can now be a 2(EGPRS2)×4 (multi carrier)×2 (MIMO)=16 times increase in the maximum transmission rate per TTI.

SUMMARY

The increase of RLC block transmission rate per TTI will increase the risk of stalling the RLC engine and therefore solutions to extend the BSN space supported by the RLC layer are needed. The disclosure herein focuses on the aspect of increasing the BSN space associated with a given RLC layer while keeping the channel coding of RLC/MAC headers intact.

The objective of increasing the BSN space supported by a given RLC layer can be accomplished by increasing the size of the BSN1, BSN2 etc. fields in the header of RLC/MAC blocks sent at the RLC layer.

This object is obtained by a method in a base station subsystem, BSS, for transmission of radio link control, RLC, blocks in an extended sequence number space, SNS, and extended transmit window size, WS on multiple downlink carriers. An RLC/Medium Access Control, MAC, header having a fixed number of bits comprises multiple control fields. A number of bits of the RLC/MAC header comprise a block sequence number, BSN, space, the BSN space comprising at least one BSN field, each BSN field including a respective BSN. The method comprises selecting one or more spare bits in the RLC/MAC header. Each RLC block is indexed with a BSN selected from a range of block indices representing an extended sequence number space, SNS, and extended transmit window size, WS, wherein the BSN is included in a BSN field of an expanded BSN space including the selected one or more spare bits.

By increasing the BSN space the transmitting entity will have the option of sending a greater number of RLC blocks before having a need to receive a corresponding confirmation of their reception. The greater number of RLC blocks is in comparison to the case where a legacy BSN space is used. Consequently, the expanded BSN space enables realization of a greater window size can be realized.

Another advantage of the disclosed method of providing an extended Sequence Number Space, SNS, and extended transmit Window Size, WS, is that a current channel coding of the RLC/MAC headers, that carry the BSN information, is maintained intact. In other words, the total number of information bits in the RLC/MAC header available for supporting the fields comprising that header (e.g. CES/P, PR, BSN1, BSN2, Reserved) are the same before and after the BSN expansion.

Selection of spare bits in a RLC/MAC header is possible for some modulation and coding schemes, MCS, for which spare bits exists.

In accordance with an aspect of the disclosure, the method comprises releasing the one or more spare bits from the one or more multiple control fields of the RLC/MAC header. One or more of the multiple control fields are selected based on a current functionality of the one or more control fields. The selected one or more multiple control fields are redefined thereby releasing one or more spare bits from one or more redefined control fields.

In accordance with an aspect of the disclosure, the method comprises releasing the one or more spare bits from the one or more multiple control fields of the RLC/MAC header. One or more of the multiple control fields are selected based on a current functionality of the one or more control fields. Bits of the selected one or more control fields are released from the current functionality, such that the functionality of the respective control field is abandoned and the released one or more bits constitute the one or more spare bits.

Different RLC/MAC header types are used for different features and different Modulation and Coding Schemes, MCS within a feature. Features that are considered are e.g EGPRS and EGPRS 2; features for which unique RLC/MAC header formats exist. An identification of active bits eligible for redefining, enables consideration of the unique header RLC/MAC header format when redefining the fields.

In accordance with a further aspect of the disclosure, the expanded BSN space is used to expand a first BSN field for a first BSN in the RLC/MAC header.

To expand the current SNS and WS used for GSM/EDGE there is a need to expand the number of bits used for BSN1 (i.e. a subset of the bits associated with the BSN space) in the RLC/MAC header.

In accordance with a further aspect of the disclosure, a subset of 12 of the expanded BSN space is used for the first BSN field in the RLC/MAC header.

Expansion of the first BSN field to a total of 12 bits provides for a sequence number space, SNS, of up to 4096 in a modulation code scheme, MCS, based on one BSN field.

In accordance with a further aspect of the disclosure, one or more further subsets of the bits of the expanded BSN space are used for expanding respective further BSN fields in the RLC/MAC header.

Expansion of the further BSN fields provides for an increased distance between the BSN fields.

In accordance with an aspect of the disclosure, a first BSN index is an absolute BSN index related to the sequence number space, SNS, and one or more further BSN indices in the same RLC block is related to a previous BSN index.

This approach will diminish limitations in addressing RLC blocks compared to current approach wherein subsequent BSN numbers are less than 11 bits and are always necessarily related to the first BSN index.

In accordance with an aspect of the disclosure, a redefined field is a power reduction field. The power reduction field is redefined to indicate one of two power reduction levels.

Release of a spare bit from the power reduction field provides for a more coarse level of indicating power reduction. However, the expansion of the current GSM standard with the multi-carrier DL feature and the use of wideband receivers diminish the need for a more detailed level. Consequently, a bit may be released from the power reduction field without significant impact on the ability of an entity receiving the power reduction indication.

In accordance with a further aspect of the disclosure, a redefined field is a Relative Reserved Block Period, RRBP, field indicating a reserved block for a response by a mobile station, MS. The RRBP field is redefined to allow one of two options for the reserved block.

The RRBP field indicates a block reserved for a response by the mobile station when not in Fast ACK/NACK Reporting, FANR, operation. The impact on the flexibility of the network is low when limiting the number of different periods for a reserved block on the UL, thus redefining of the RRBP field provides an advantageous solution for releasing bits and providing an expanded BSN space.

In accordance with an aspect of the disclosure, a redefined field is a Combined EGPRS Supplementary/Polling Field, CES/P, field used when FANR operation is enabled to request feedback from a mobile station, MS, regarding Ack/Nack information and/or measurement reports. The CES/P field is redefined to allow selection of one of four options for the poll response time and Ack/Nack reporting type.

Similarly to the case of redefining the RRBP filed, the impact on flexibility is low when redefining the CES/P. Thus, redefining of the CES/P field provides for an advantageous solution for releasing bits and providing an expanded BSN space.

In accordance with a further aspect of the disclosure, pre-existing BSN fields in the BSN space are re-arranged by expanding a first BSN field used for a first BSN. The further pre-existing BSN fields in the BSN space are reduced.

The rearranging of pre-existing BSN fields provides for an advantageous solution to an expanded first BSN field when the MCS allows for RLC blocks that contain two or more radio blocks.

The object of the disclosure is further obtained by a mobile station in a wireless communication network. The mobile station comprises an antenna unit, an I/O-unit, a receive unit, a transmit unit, a memory unit and a control unit. The control unit is configured to acknowledge receipt of RLC blocks in an acknowledgment. The RLC blocks are received in an extended sequence number space, SNS, and extended transmit window size, WS. The acknowledgement includes one or more BSN indices received in respective BSN fields of an expanded BSN space in a RLC/MAC header. The expanded BSN space includes one or more redefined bits of the RLC/MAC header. An upper limit of RLC blocks received prior to acknowledgement is limited by the extended transmit window size increased in correspondence with the expanded BSN space.

The object of the disclosure is further obtained by a base station subsystem (110) in a wireless communication network. The base station subsystem, BSS, comprises an I/O-unit, a receive unit, a transmit unit, a memory unit and a control unit. The control unit is configured to transmit RLC blocks in an extended sequence number space, SNS, and extended transmit window size, WS. Each RLC block including an RLC/MAC header comprising a BSN index selected from a range of block indices representing the extended sequence number space, SNS, and extended transmit window size, WS. The BSN index is included in a BSN field of an expanded BSN space in the RLC/MAC header. The expanded BSN space includes one or more redefined bits of the RLC/MAC header.

The object of the disclosure is further obtained by a computer program comprising computer program code which, when executed in a mobile station, causes the mobile station to process radio link control, RLC, blocks, of an extended sequence number space, SNS, and extended transmit window size, WS. The RLC blocks are indexed in one or more BSN fields of an expanded BSN space, wherein the expanded BSN space is provided according to any of the various method aspects disclosed above.

The object of the disclosure is further obtained by a computer program comprising computer program code which, when executed in a base station subsystem causes the base station subsystem to process radio link control, RLC, blocks of an extended sequence number space, SNS, and extended transmit window size, WS. The RLC blocks are indexed in one or more BSN fields of an expanded BSN space, wherein the expanded BSN space is provided according to any of the various method aspects disclosed above.

The disclosed method, mobile station, base station subsystem and computer program will offer the option of sending a greater number of RLC blocks in a given transmission time interval, TTI, in comparison to a case when legacy BSN space is used, without needing to receive a corresponding confirmation at their reception at the receiving entity.

With the above description in mind, the object of the present disclosure is to overcome at least some of the disadvantages of known technology as described above and below.

BRIEF DESCRIPTION OF THE DRAWINGS

Further objects, features, and advantages of the present disclosure will appear from the following detailed description, wherein some aspects of the disclosure will be described in more detail with reference to the accompanying drawings, in which.

DETAILED DESCRIPTION

Figure 1:
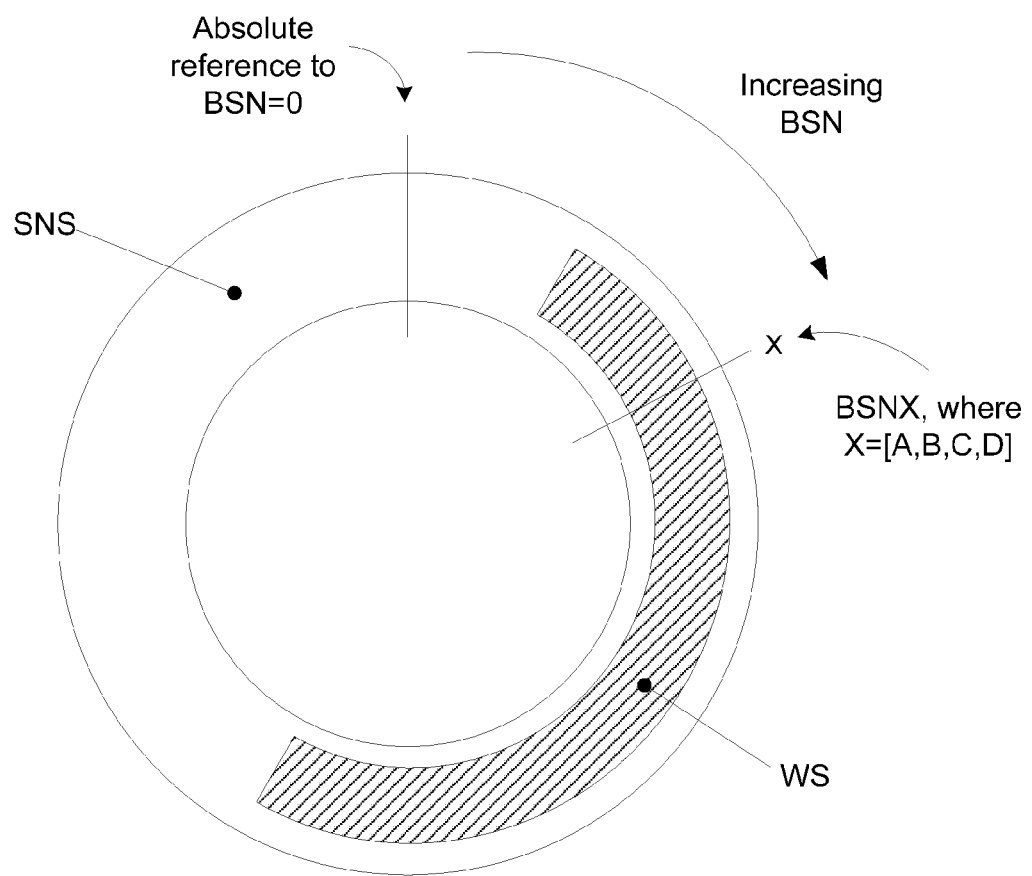
FIG. 1 illustrates Window size, WS, and Sequence Number Space, SNS.

Aspects of the present disclosure will be described more fully hereinafter with reference to the accompanying drawings. The method, mobile station and base station subsystem disclosed herein can, however, be realized in many different forms and should not be construed as being limited to the aspects set forth herein. Like numbers in the drawings refer to like elements throughout.

The terminology used herein is for the purpose of describing particular aspects of the disclosure only, and is not intended to limit the invention. As used herein, the singular forms "a", "an" and "the" are intended to include the plural forms as well, unless the context clearly indicates otherwise.

When considering different header types for different features and modulation and coding schemes, MCS, in terms of what RLC/MAC functionality the corresponding fields provide, the RLC/MAC header formats are similar irrespective of MCS.

Figure 2:
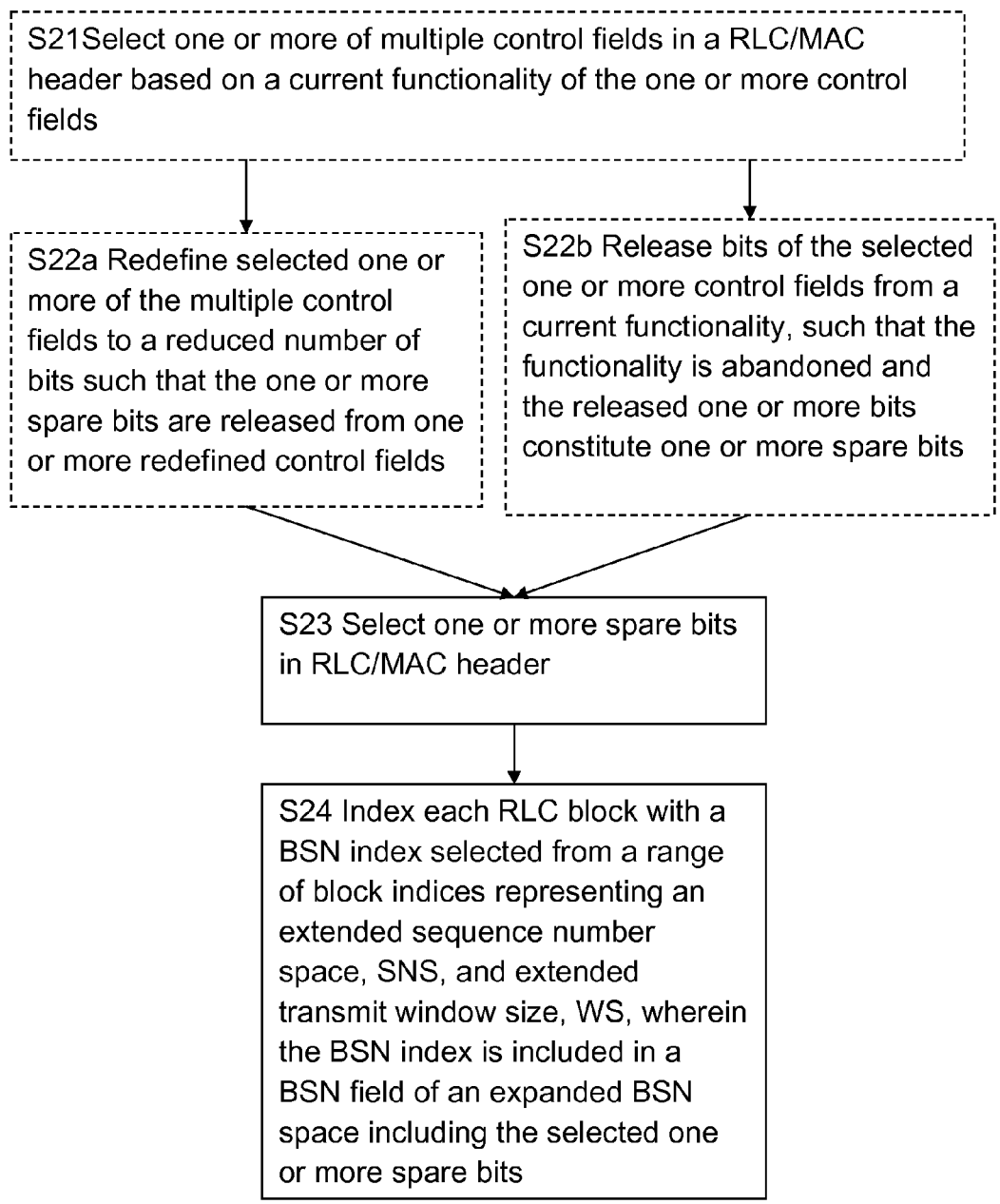
FIG. 2 is a flowchart illustrating embodiments of method steps for providing an extended sequence number space, SNS and extended transmit window size, WS.

FIG. 2 discloses a method in a base station subsystem, BSS, for transmission of radio link control, RLC, blocks in an extended sequence number space, SNS, and extended transmit window size, WS on multiple downlink carriers. An RLC/Medium Access Control, MAC, header having a fixed number of bits comprises multiple control fields. A number of bits of the RLC/MAC header comprise a block sequence number, BSN, space, the BSN space comprising at least one BSN field, each BSN field including a respective BSN. The method comprises selecting S23 one or more spare bits in the RLC/MAC header. As will be further detailed below, the spare bits are selected from existing spare bits in the RLC/MAC header or from spare bits that have been released from one or more redefined fields (active bits).

It can be noted that for some header types for EGPRS2 there are two spare bits existing in the RLC/MAC header formats that could be used for BSN space expansion. However, selection of these spare bits is not a general solution to all situations since a unique reference to the SNS is needed irrespective of MCSs used during RLC block transmission, and EGPRS2 MSs need to be able to receive also blocks transmitted with EGPRS (due to USF/PAN backwards compatibility issues) where these two spare bits are not present.

As mentioned previously, there exist spare bits for some MCSs that can be used to expand the BSN number space. Care needs however to be taken since not all MCSs in a feature set might have bits to spare in the header, and due to backwards compatibility issues, there might be a need to transmit MCSs from another feature set to the MS using the same RLC engine supported on the same DL TBF. A MS in EGPRS2 data transfer needs, for example, to be able to receive some EGPRS MCSs, depending on different factors. Thus, a consistent solution is needed for all types of RLC block transmissions (i.e. the size of the BSN1 field must be consistent even when switching to an MCS where spare bits are not supported).

Spare bits are available for all modulation and coding schemes, DBS-5-12, for EGPRS2-B and for modulation and coding schemes DAS-8-12 for EGPRS2-A.

A subsequent step comprises indexing S24 each RLC block with a BSN index selected from a range of block indices representing an extended sequence number space, SNS, and extended transmit window size, WS, wherein the BSN index is included in a BSN field of an expanded BSN space including the selected one or more spare bits. The steps of selecting S23 and of indexing S24 illustrate a basic concept for expanding the SNS and WS for GSM/EDGE operation. The BSN space is expanded while maintaining the current RLC/MAC block header channel coding and all or part of the functionality supported by the fields comprising the RLC/MAC header intact.

The disclosed method is based on a number of assumptions listed below:
1. It is assumed that the current channel coding of the RLC/MAC headers, that amongst other things, carry the BSN information, is to be kept intact. In other words, the total number of information bits in the RLC/MAC header available for supporting the fields comprising that header (e.g. CES/P, PR, BSN1, BSN2, Reserved) are the same before and after the BSN expansion.
2. Most of the current functionality of the fields comprising RLC/MAC headers, e.g. identifiers, need to be kept intact, i.e. unchanged in size and function, also after the BSN space expansion. This imposes limitations regarding what header fields, i.e. active bits, can be redefined or modified.
3. To expand the current SNS and WS used for GSM/EDGE there is a need to expand the number of bits used for BSN1, i.e. a subset of the bits associated with the BSN space, in the RLC/MAC header.
4. Since different RLC/MAC header types are used for different features and different Modulation and Coding Schemes, MCS, within the feature, a distinction between feature and header types carrying different number of BSNs is required.
5. The examples provided herein apply to RLC/MAC header types for DL transmission and is disclosed for downlink, but the principles of the invention apply to UL transmission as well.
6. Since transmission of RLC blocks that make use of MCSs associated with different feature levels, for example between EGPRS and EGPRS2, can occur in the same data session for a specific connection, a consistent solution for BSN expansion is aimed for that work irrespective of feature or feature combination used.
7. The features that are considered are EGPRS, EGPRS2, EGPRS/EGPRS2+ LATRED, RTTI and FANR, which are the features where unique RLC/MAC header formats exist.
8. For an MCS that contains more than one RLC block, the first BSN field (BSN1) will contain an absolute reference to the SNS while the subsequent BSN fields will be defined relative to the previous BSN field, i.e. BSN2 relative to BSN1, BSN3 relative to BSN2 etc. This is different from the current specification where the subsequent BSN fields are all defined relative to BSN1.

The spare bits are selected from existing spare bits in the RLC/MAC header or from spare bits that have been released from one or more redefined fields, active bits. The RLC/MAC header comprises multiple control fields. Release S22a of spare bits from these one or more multiple control fields is possible when the multiple control fields have been subject to redefining S22a. Selecting S21 one or more of the multiple control fields eligible for redefining precedes the actual redefining S22a and release of spare bits.

The RLC/MAC header formats are very similar when considering different header types for different features and MCSs in terms of what RLC/MAC functionality their corresponding fields provide. The potential extension of the BSN space will therefore rely on the reduction of non-BSN related field space within the RLC/MAC header, i.e. redefining S22a or elimination/abandoning S22b of non-BSN related fields. This is especially important for the MCSs only supporting the transmission of one RLC block, in order to have an absolute reference in the SNS.

Spare bits may also be procured by selecting S21 one or more of multiple control fields in the RLC/MAC header that can be completely redefined. A subsequent step involve releasing S22b one or more bits of the identified one or more fields. The bits are released from a current functionality, such that the corresponding functionality is abandoned and the released one or more bits constitute the one or more spare bits.

The expanded BSN space is used to expand a first BSN field for a first BSN index in the RLC/MAC header. To expand the current SNS and WS used for GSM/EDGE there is a need to expand the number of bits used for BSN1, i.e. a subset of the bits associated with the BSN space, in the RLC/MAC header.

In the following a number, a few examples of re-defining of selected RLC/MAC header control fields will be provided. Examples are provided for re-defining of the power reduction field, re-defining of the CES/P field and re-defining of the RRBP field. Exemplification is also provided for identification and use of spare bits in the RLC/MAC header and re-arrangement of BSN fields in the RLC/MAC header.

Re-Defining the Power Reduction Field

The power reduction field is today included within all RLC/MAC header formats and is used to indicate the power reduction of the RLC block(s) to the MS. This is primarily used for the MS to adapt its automatic gain control (AGC) to avoid saturation in the receiver. The down regulations available from the network are listed in Table 1.

TABLE 1

| bit 8 7 | Power Reduction |
|---|---|
| 0 0 | 0 dB (included) to 3 dB (excluded) less than BCCH level - P0 |
| 0 1 | 3 dB (included) to 7 dB (excluded) less than BCCH level - P0 |
| 1 0 | 7 dB (included) to 10 dB (included) less than BCCH level - P0 |
| 1 1 | Not usable |

A reduced PR field could use a more coarse level of indicating power reduction. This is motivated by:
- The MS already today needs AGC functionality in addition to the power reduction indicated by the network. Specifically the power reduction indicated by the PR field can only be used on consecutive downlink radio blocks.
- The expansion of the current GSM standard with the Multi-carrier DL (MCDL) feature and the use of wideband receivers will diminish the importance of the level of the wanted DL carrier signal. I.e. the AGC will no longer primarily be tuned to the narrowband wanted DL carrier, but rather to the composite signal received over a wider band during MCDL operation.

A proposed redefined and reduced PR field, as per S21 and S22a of FIG. 2, releasing one bit is seen in Table 2.

TABLE 2

| bit 8 | Power Reduction |
|---|---|
| 0 | 0 dB (included) to 5 dB (excluded) less than BCCH level - P0 |
| 1 | 5 dB (included) to 10 dB (excluded) less than BCCH level - P0 |

It can also be noted that a possibility would be to remove the PR field altogether, as per S21 and S22b of FIG. 2, considering the functionality dependent on the PR field is proprietary and not strictly necessary. The removal of the PR field in favor of extending the BSN space will therefore demand the implementation of AGC functionality without the information provided in PR whenever features that make use of enhanced BSN space operation are enabled.

Re-Defining the CES/P Field

The CES/P is the Combined EGPRS Supplementary/Polling Field and is used when FANR operation is enabled. The main functionality of the field is for the network to request feedback from the mobile station regarding ACK/NACK information and/or measurement reports. Two different poll response times (i.e. relative to the downlink block where the poll is received by the MS) are used to reserve the block on the UL wherein the poll response is to be sent by the MS. Different response times are used to allow for more flexibility in the scheduling of poll responses from network side. The current CES/P field is shown in Table 3. Different response times exist for Basic Transmission Time Interval, BTTI, or Reduced Transmission Time Interval, RTTI.

reservation of different future uplink radio blocks for sending the poll response, a feature such as MCDL expands the flexibility of the network to poll a MS on several DL carriers. Thus, the overall impact on the flexibility of the network to poll the MS based on introducing one possible poll response time is small. A reduced CES/P field is shown in Table 4

It can be noted that already today there is not sufficient code point space within the CES/P to support all options of ACK/NACK reporting type, message type, measurement report inclusion and response time. All possible combinations would result in 17 code points needed (1(no poll)+2 (FPB or NPB)*2(Piggy-backed or not)*2(Measurement report or not included)*2(Different reserved block periods)).

TABLE 3

| bits | CES/P | | |
|---|---|---|---|
| | | Reserved Block | |
| 6 5 4 Feedback | | BTTI | RTTI |
| 0 0 0 no Polling | | — | — |
| 0 0 1 Extended Ack/Nack bitmap type FPB | | (N + 8 or N + 9) mod 2715648 | (N + 6 or N + 7) mod 2715648 |
| 0 1 0 Extended Ack/Nack bitmap type FPB | | (N + 13) mod 2715648 | (N + 8 or N + 9) mod 2715648 |
| 0 1 1 Piggy-backed Ack/Nack bitmap type FPB (see sub-clause 8.1.2.2) see note | | (N + 8 or N + 9) mod 2715648 | (N + 6 or N + 7) mod 2715648 |
| 1 0 0 Piggy-backed Ack/Nack bitmap type FPB (see sub-clause 8.1.2.2) see note | | (N + 13) mod 2715648 | (N + 8 or N + 9) mod 2715648 |
| 1 0 1 Extended Ack/Nack bitmap type NPB, measurement report included | | (N + 8 or N + 9) mod 2715648 | (N + 6 or N + 7) mod 2715648 |
| 1 1 0 Extended Ack/Nack bitmap type NPB, measurement report included | | (N + 13) mod 2715648 | (N + 8 or N + 9) mod 2715648 |
| 1 1 1 Extended Ack/Nack bitmap type NPB | | (N + 8 or N + 9) mod 2715648 | (N + 6 or N + 7) mod 2715648 |

NOTE:
In case where a PAN cannot be sent, the Extended Ack/Nack bitmap type NPB with measurement report included shall be transmitted on the allocated reserved block instead (see sub-clause 9.1.14.2).

A reduced CES/P field, as per S21 and S22a of FIG. 2, could only allow for one poll response time. This is motivated by the evolution of the standard since the CES/P was defined. I.e. the features that require an extension of the RLC layer SNS, i.e. the BSN space and WS do so because the number of Radio Blocks transmitted in a TTI has increased. Thus, instead of the current flexibility of allowing the The reduced CES/P field needs to reduce these options even further, allowing for only one possible poll response time, and removing some options e.g. the option of sending an 'Extended ACK/NACK bitmap NPB with no measurement report included'.

One possible redefining and reduction of the CES/P field releasing 1 bit is shown in Table 4.

TABLE 4

| bits | CES/P | | |
|---|---|---|---|
| | | Reserved Block | |
| 5 4 Feedback | | BTTI | RTTI |
| 0 0 no Polling | | — | — |
| 0 1 Extended Ack/Nack bitmap type FPB | | (N + 8 or N + 9) mod 2715648 | (N + 6 or N + 7) mod 2715648 |
| 1 1 Piggy-backed Ack/Nack bitmap type FPB (see sub-clause 8.1.2.2) see note | | (N + 8 or N + 9) mod 2715648 | (N + 6 or N + 7) mod 2715648 |
| 1 0 Extended Ack/Nack bitmap type NPB, measurement report included | | (N + 8 or N + 9) mod 2715648 | (N + 6 or N + 7) mod 2715648 |

NOTE:
In case where a PAN cannot be sent, the Extended Ack/Nack bitmap type NPB with measurement report included shall be transmitted on the allocated reserved block instead (see sub-clause 9.1.14.2).

Re-Defining the RRBP Field

The RRBP is similar to the CES/P field in that it indicates the block reserved for a response by the MS when not in FANR operation.

This can similarly be reduced, as per S21 and S22a of FIG. 2, by limiting the number of different periods for the reserved block on the UL.

Table 5 discloses a current RRBP

TABLE 5

| bit 6-5/7-6 | Full-rate PDCH uplink block with TDMA frame number | Half-rate PDCH uplink block with TDMA frame number |
|---|---|---|
| 0 0 | (N + 13) mod 2715648 | Reserved |
| 0 1 | (N + 17 or N + 18) mod 2715648 | (N + 17 or N + 18) mod 2715648 |
| 1 0 | (N + 21 or N + 22) mod 2715648 | Reserved |
| 1 1 | (N + 26) mod 2715648 | (N + 26) mod 2715648 |

Table 6 discloses one possible redefining and reduction of the RRBP field releasing 1 bit

TABLE 6

| bit 5/6 | Full-rate PDCH uplink block with TDMA frame number | Half-rate PDCH uplink block with TDMA frame number |
|---|---|---|
| 0 0 | (N + 13) mod 2715648 | (N + 17 or N + 18) mod 2715648 |
| 0 1 | (N + 17 or N + 18) mod 2715648 | (N + 26) mod 2715648 |

Re-Arranging the BSN Fields in the RLC/MAC Header

When the MCS allows for RLC blocks that contain two or more radio blocks, the expansion of the BSN space could also be kept within the size constraints of the current BSN related fields in the RLC/MAC header. The current BSN size is 11 bits for the first BSN number (BSN1) and 10 bits for subsequent BSN numbers (BSN2, BSN3, BSN4). The available information bits are reflected in table 7.

TABLE 7

| Number of BSNs (RLC blocks) | Half-rate PDCH uplink block with TDMA frame number |
|---|---|
| 2 | 11 + 10 = 21 |
| 3 | 11 + 10 + 10 = 31 |
| 4 | 11 + 10 + 10 + 10 = 41 |

Given assumption 3, we need one absolute reference to the first BSN number, BSN1. Thus any expansion of the first BSN number space (i.e. BSN1), will mean a reduction of the space of the following BSN numbers (BSN2-BSN4).

It is the assumption that subsequent BSN numbers are always defined relative to the previous BSN number (basic assumption 8). Thus, the limitations in addressing RLC blocks will diminish compared to the approach used today wherein the subsequent BSN numbers (i.e. BSN2, BSN3 and BSN4) are always relative to BSN1.

For an MCS carrying 2 BSN numbers (and therefore 2 RLC blocks), the first BSN number (BSN1) can be expanded to 12 bits while reducing the second BSN number (BSN2) to 9 bits. This would mean that the two BSN numbers can only be separated by at most 512 numbers ($2^9$). It should be noted that it is only the separation between BSN1 and BSN2 that is important, and not that BSN A+BSN B<512 (i.e. the receiver relies on this separation rule being enforced at the transmitter so that it can recover the original BSN A and BSN B values associated with each of the 2 RLC blocks.

Example

MCS Carrying 2 BSN Numbers

SNS=4096
WS=2048
BSN A=4000, BSN B=300

BSN A and BSN B are both absolute BSN values that must be examined to determine if they map to BSN1 or BSN2 by determining which represents the oldest BSN value. Once this is determined, the oldest BSN value maps directly to BSN1 and the other BSN value maps indirectly to BSN2 by expressing it as a value relative to BSN1.

(BSN B−BSN A) modulo SNS=396<512
BSN A−BSN B) modulo SNS=3700>512
BSN 1=BSN A (absolute BSN value)=4000
BSN 2=396 (relative BSN value to BSN1)

For MCSs carrying 3 or 4 BSNs the flexibility on the choice of BSN sizes is of course increased.

The only requirement on BSN bit space allocations in the 3 BSN case with a 2 times expansion of the SNS and WS are:

BSN1 bit space+BSN2 bit space+BSN3 bit space=31
BSN1 space=12

Below, a generic description on how to map the absolute BSN values [i.e. BSN A-D] associated with 4 RLC blocks to the BSN values in the header [i.e. BSN1-4] is outlined below.

Given a certain BSN bit space limitation, for example [BSN1,BSN2,BSN3,BSN4] bits=[12,11,10,10] bits, the maximum separation allowed between each BSN pair (i.e. 2 consecutive BSN fields) is given.

Go through all pair-wise combinations of BSN A–BSN D to determine how to map the corresponding numbers to BSN 1-4. The limiting factors in determining this mapping is the separation between two absolute BSN values ((BSN X−BSN Y) modulo SNS)), and the given BSN space limitations in the RLC block header (i.e. the size of BSN1, BSN2 etc.).

Determine which mapping of absolute BSN values that can be used taking into account the absolute ordering, i.e. that BSN2 is defined relative to BSN1, BSN3 relative to BSN2 etc.

Example

MCS Carrying 4 BSN Numbers

SNS=$2^{12}$=4096
WS=$2^{12-1}$=2048

The absolute BSN values are [BSN A, BSN B, BSN C, BSN D]=[50, 3504, 2574, 4001].

The given BSN space limitations are: [BSN1,BSN2,BSN3,BSN4]=[12,11,9,9] bits, i.e. adding up to 41 bits according to Table 7.

The resulting maximum separation between each BSN pair is given by (Step 1):
[BSN 1, BSN 2]=2048
[BSN 2, BSN 3]=512
[BSN 3, BSN 4]=512
All combinations are shown in Table 8 below

TABLE 8

| Calculation | Separation | <512 [BSN2, BSN3] [BSN3, BSN4] | <2048 [BSN2, BSN2] |
|---|---|---|---|
| A-B mod(50-3504,4096) | 642 | N | Y |
| B-A mod(3504-50,4096) | 3454 | N | N |
| A-C mod(50-2574,4096) | 1572 | N | Y |
| C-A mod(2574-50,4096) | 2524 | N | N |
| A-D mod(50-4001,4096) | 145 | Y | Y |
| D-A mod(4001-50,4096) | 3951 | N | N |
| B-C mod(3504-2574,4096) | 930 | N | Y |
| C-B mod(2574-3504,4096) | 3166 | N | N |
| B-D mod(3504-4001,4096) | 3599 | N | N |
| D-B mod(4001-3504,4096) | 497 | Y | Y |
| C-D mod(2574-4001,4096) | 2669 | N | N |
| D-C mod(4001-2574,4096) | 1427 | N | Y |

From all combinations given above, at least one mapping that satisfies the limitations on BSN separation identified needs to be found.

Figure 3:
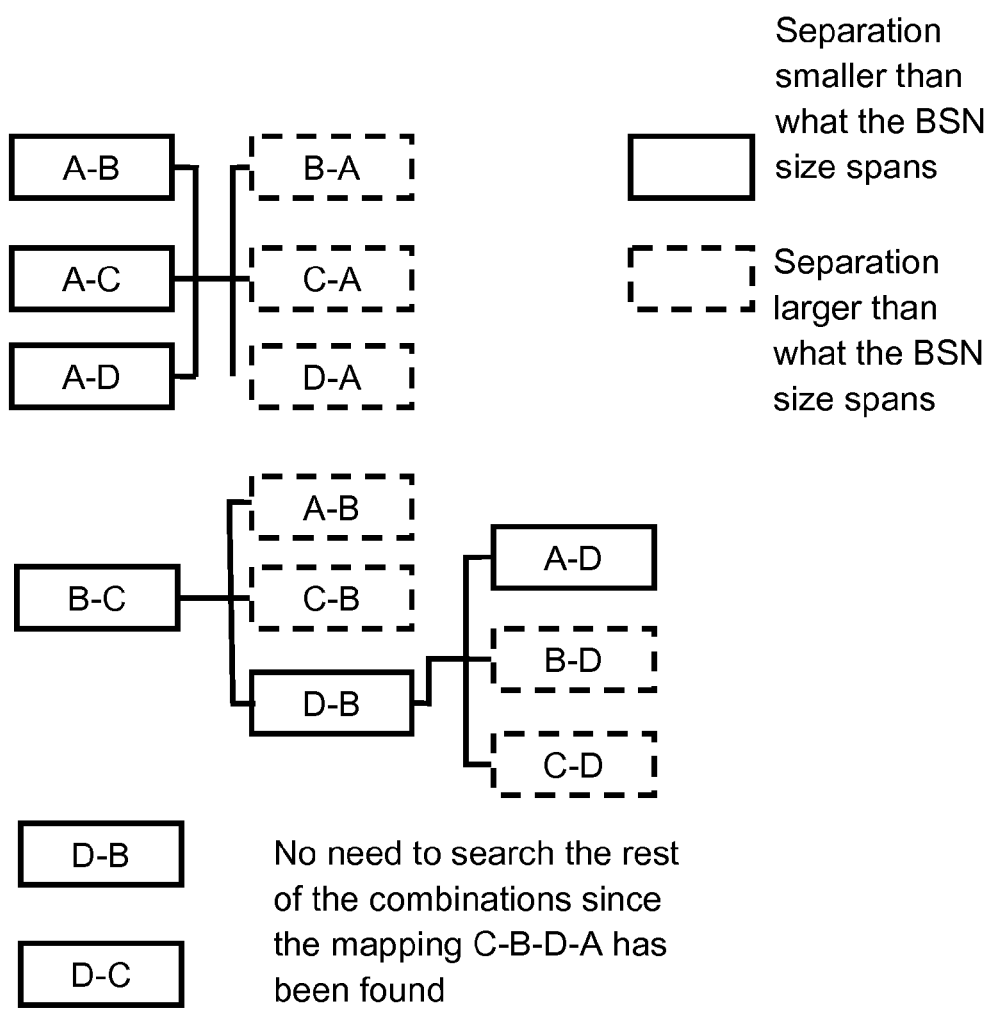
FIG. 3 illustrates mapping of BSN-A to BSN-D to BSN1 to BSN4.

The process of finding a mapping that is also consistent with the BSN order in the header is shown in FIG. 3, which shows Mapping of BSN-A to BSN-D to BSN1 to BSN4, where BSN1 to BSN4 is relating to the BSN fields (up to four) actually included within the RLC/MAC header definition (i.e. sent over the radio interface), and BSN-A to BSN-D are the absolute BSN values in the SNS maintained by the RLC protocol engine implemented in the BSS and MS, and A 'Y' in table 8 above is mapped to a solid line box in FIG. 3 while a 'N' is mapped to a dashed line box. There is a need to find a mapping where all BSNs can be mapped.

In FIG. 3, the first possible mapping found is B-C, D-B, A-D, since the separation between BSN C and BSN B is less than 2048, if BSN C is mapped to BSN 1, and BSN B mapped to BSN2.

between BSN B and BSN D is less than 512, if BSN D is mapped to BSN3 (BSN B already mapped to BSN2, as per first bullet)

between BSN D and BSN A is less than 512, if BSN A is mapped to BSN4 (BSN D is already mapped to BSN 3)

The mapping found is:
BSN1=BSN C=2574 (Absolute reference as per basic assumption 8)
BSN2=mapped BSN B=930 (mod(2574+930,4096)=3504)
BSN3=mapped BSN D=497 (mod(2574+930+497, 4096)=4001)
BSN4=mapped BSN A=145 (mod(2574+930+497+145, 4096)=50)

Whereby the blocks are ordered following the increasing relative distance to BSN1.

As per Table 8 above:
(BSN B−BSN C)modulo 4096=930<2048
(BSN D−BSN B)modulo 4096=497<1024
(BSN A−BSN D)modulo 4096=145<1024

A Combination of the Solutions Above

It should be noted that combinations of the above disclosed methods for expanding the BSN space can be applied.

Table 9 illustrates an example wherein it is assumed that the SNS is expanded to twice the size of today with the use of the reduced PR field, reduced RRBP/CES/P, and spare bits.

TABLE 9

| Feature | MCS | Header Type | Reduced PR (1 bit) | Reduced RRBP CES/P 1 (bit) | Spare Bits (0, 1 or 2) | BSN X size (BSN1 + BSN2, etc) | Comment |
|---|---|---|---|---|---|---|---|
| EGPRS | MCS-1 | 3 | Yes | No | No spare bits available | 12 | No restrictions apply |
|  | MCS-2 |  |  |  |  | 12 |  |
|  | MCS-3 |  |  |  |  | 12 |  |
|  | MCS-4 |  |  |  |  | 12 |  |
|  | MCS-5 | 2 |  |  |  | 12 |  |
|  | MCS-6 |  |  |  |  | 12 |  |
|  | MCS-7 | 1 |  | Yes |  | 12 + 11 |  |
|  | MCS-8 |  |  |  |  | 12 + 11 |  |
|  | MCS-9 |  |  |  |  | 12 + 11 |  |
| EGPRS2-A | DAS-5 | 2 |  | No | No spare bits available | 12 |  |
|  | DAS-6 |  |  |  |  | 12 |  |
|  | DAS-7 |  |  |  |  | 12 |  |
|  | DAS-8 | 4 |  | Yes | 0 | 12 + 11 |  |
|  | DAS-9 |  |  |  |  | 12 + 11 |  |
|  | DAS-10 | 10 |  |  |  | 12 + 11 |  |
|  | DAS-11 | 5 |  |  | 1 | 12 + 11 + 11 |  |
|  | DAS-12 |  |  |  |  | 12 + 11 + 11 |  |
| EGPRS2-B | DBS-5 | 6 |  | No | 0 | 12 |  |
|  | DBS-6 |  |  |  |  | 12 |  |
|  | DBS-7 | 7 |  | Yes | 0 | 12 + 11 |  |
|  | DBS-8 |  |  |  |  | 12 + 11 |  |
|  | DBS-9 | 8 |  |  | 1 | 12 + 11 + 11 |  |
|  | DBS-10 |  |  |  |  | 12 + 11 + 11 |  |
|  | DBS-11 | 9 |  |  | 2 | 12 + 11 + 11 + 11 |  |
|  | DBS-12 |  |  |  |  | 12 + 11 + 11 + 11 |  |

Example 2

Restrictions in BSN3 and BSN4 Size

In the previous example a different number of spare bits were used for different EGPRS2 MCSs to avoid any restrictions in the mapping of absolute BSN values to BSN X values included in RLC/MAC headers.

However, functionality signaled in the RLC/MAC header typically does not have a dependency on the number of BSN fields. I.e. a field in the RLC/MAC header will have the same size irrespective of the number of BSN fields it carries. To use the two spare bits available for the EGPRS2 headers, and especially if only one spare bit is used for certain MCSs while some MCSs require two spare bits to be used (as in the example above), there will be an imbalance in the headers for a future additions in RLC/MAC functionality. It is thus of interest not to make use of the spare bits in the header to enable a future proof solution for the EGPRS2 header types.

The expansion in the following example has thus been designed to avoid any impact on the spare bits, and is captured in Table 10.

TABLE 10

| Feature | MCS | Header Type | Reduced PR (1 bit) | Reduced RRBP CES/P 1 (bit) | Spare Bits (0, 1 or 2) | BSN X size (BSN1 + BSN2, etc) |
|---|---|---|---|---|---|---|
| EGPRS | MCS-1 | 3 | Yes | No | 12 | No restriction |
|  | MCS-2 |  |  |  | 12 |  |
|  | MCS-3 |  |  |  | 12 |  |
|  | MCS-4 |  |  |  | 12 |  |
|  | MCS-5 | 2 |  |  | 12 |  |
|  | MCS-6 |  |  |  | 12 |  |
|  | MCS-7 | 1 |  | Yes | 12 + 11 |  |
|  | MCS-8 |  |  |  | 12 + 11 |  |
|  | MCS-9 |  |  |  | 12 + 11 |  |
| EGPRS2-A | DAS-5 | 2 |  | No | 12 | No restriction |
|  | DAS-6 |  |  |  | 12 |  |
|  | DAS-7 |  |  |  | 12 |  |
|  | DAS-8 | 4 |  | Yes | 12 + 11 |  |
|  | DAS-9 |  |  |  | 12 + 11 |  |
|  | DAS-10 | 10 |  |  | 12 + 11 |  |
|  | DAS-11 | 5 |  |  | 12 + 11 + 10 | Restriction in BSN3. See i) below |
|  | DAS-12 |  |  |  | 12 + 11 + 10 |  |
| EGPRS2-B | DBS-5 | 6 |  | No | 12 | No restriction |
|  | DBS-6 |  |  |  | 12 |  |
|  | DBS-7 | 7 |  | Yes | 12 + 11 |  |
|  | DBS-8 |  |  |  | 12 + 11 |  |
|  | DBS-9 | 8 |  |  | 12 + 11 + 10 | Restriction in BSN3. See i) below |
|  | DBS-10 |  |  |  | 12 + 11 + 10 |  |
|  | DBS-11 | 9 |  |  | 12 + 11 + 10 + 10 | Restriction in BSN3 and BSN4. See ii) below |
|  | DBS-12 | 3 | Yes | No | 12 | No restriction |

It can be seen that since only two bits exist for expansion (PR and RRBP/CES/P) there will be some limitations in the BSN size for the case of 3 or 4 RLC blocks per radio block.

The restrictions are further analyzed below
i) Three RLC Blocks/Radio Block

As can be seen in table 12, the BSN X sizes have been chosen as [12;11;10] for this case. As mentioned in 6.4.6, other alternatives are also possible, as long as BSN1 is of length 12 bits. Based on the previous discussion it is clear that the choice of 12 and 11 bits for BSN1 and BSN2 respectively will allow for no restriction in the separation of these two BSNs (since the allowed separation of these two BSNs can cover up to the specified WS).

Between BSN2 and BSN3 however the separation allowed is at most 1024 ($2^{10}$). The approach to identify the mapping of BSNs is elaborated in section 6.4.6. The restriction in BSN3 will require that at least one of the separations between A-B, B-C and C-A needs to be no greater than 1024.
ii) Four RLC Blocks/Radio Block For the case with four RLC blocks in Table 12, the BSN X sizes have been chosen as [12;11;10;10], and as for the three RLC block case, the restriction will be in that the separation of at least two of A-B, A-C, A-D, B-C, B-D, C-D should be no greater than 1024. In addition one of the BSNs needs to be common to the two pairs, e.g. A-B and B-D, so that A-B-D can be mapped to BSN 2-3-4.

It is not only the BSN X fields in the transmitted header that should be expanded but also the feedback procedure from the receiving end needs to be expanded. Also here the importance is the increase of the reference BSN to which the reporting bit map is referring to. The reference BSN is usually named the starting sequence number (SSN), and can be found in both the Piggy-backed ACK/NACK and Extended ACK/NACK bitmaps.

Since both the piggy-backed ACK/NACK and the Extended ACK/NACK bitmaps uniquely identifies the TBF there is no confusion at the receiving end on how to interpret the bitmap received, and thus an expansion of the SSN when using the multi-carrier feature will not impact the current SSN design, or cause any problems with backwards compatibility.

The disclosure expands the Sequence Number Space, SNS of the RLC engine for EGPRS services which allows for the expansion of the number of radio blocks possible to transmit to the MS within a given transmission time interval as would be required by the use of for example Multi-carrier DL and MIMO.

Different options of how to expand the SNS space have been outlined. All options keep the RLC/MAC header coding intact, and allows for full backwards compatibility with legacy header formats.

The principles of the invention apply both in Downlink, DL, and in Uplink, UL. Thus, the nodes to which the terms "transmitting entity" and "receiving entity" used above apply will vary depending on whether the invention is applied in UL or in DL. However, the connection will be between a Mobile Station at one end and a BTS and a BSC at the other end, and at each of these ends, the transmitting and/or receiving functionality described above will be located. Hence, the disclosure herein relates both to an MS and to a BTS and/or a BSC with said functionalities. (BTS: Base Transceiver Station, BSC: Based Station Controller; MS: Mobile Station).

Figure 4:
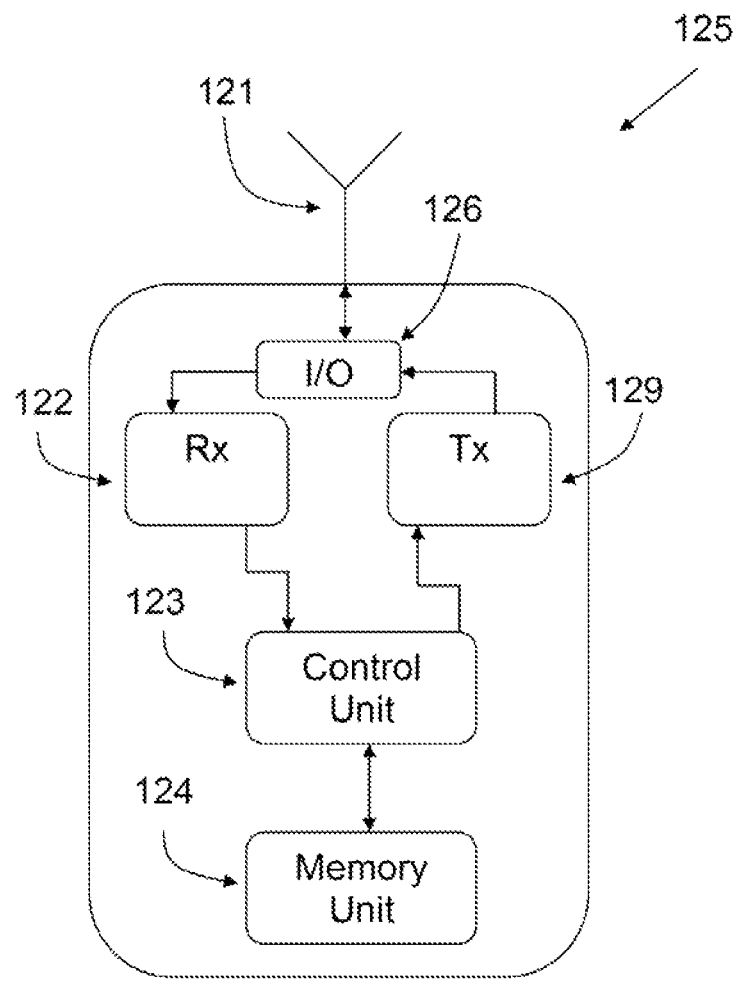
FIG. 4 illustrates an exemplary block diagram of a mobile station, MS.

FIG. 4 discloses an exemplary block diagram of a mobile station, MS, 125. The MS comprises antenna unit 121, an I/O-unit 126, a receive unit 122 and a transmit unit 129. The function of the MS is mainly controlled by a control unit 123, suitably with the aid of a memory unit 124. The control unit is configured to acknowledge receipt of RLC blocks in an acknowledgment. The RLC blocks are received in an extended sequence number space, SNS, and extended transmit window size, WS. The acknowledgement includes one or more BSN indices received in respective BSN fields of an expanded BSN space in a RLC/MAC header. The expanded BSN space includes one or more redefined bits of the RLC/MAC header. An upper limit of RLC blocks received prior to acknowledgement is limited by the extended transmit window size increased in correspondence with the expanded BSN space.

Figure 5:
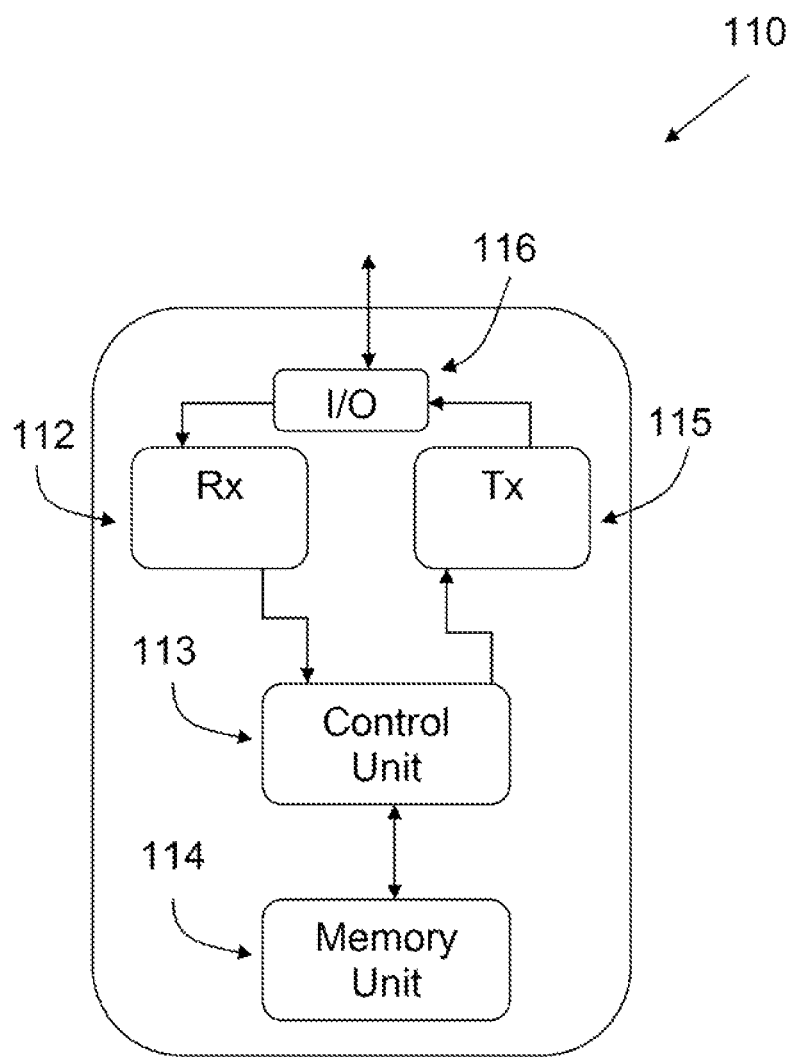
FIG. 5 illustrates an exemplary block diagram of a generic "base station" subsystem, BSS, such as either the BSC or the BTS of a GSM/EDGE system

FIG. 5 disclose an exemplary block diagram of a generic "base station" subsystem 110, such as either the BSC and/or the BTS of a GSM/EDGE system. The base station subsystem 110 is equipped with an I/O-unit 116 for wireless connection to one or more mobile stations, and also to higher nodes in the system, wirelessly or by means of landlines. The base station subsystem 110 also comprises a receive unit 112 and a transmit unit 115. The function of the base station subsystem is mainly controlled by a control unit 113, suitably with the aid of a memory unit 114, in addition to which the base station can also to some extent be controlled by higher nodes in the system, e.g. a BSC in a GERAN system or an RNC of an UTRA system. The control unit is configured to transmit RLC blocks in an extended sequence number space, SNS, and extended transmit window size, WS. Each RLC block including an RLC/MAC header comprising a BSN index selected from a range of block indices representing the extended sequence number space, SNS, and extended transmit window size, WS. The BSN index is included in a BSN field of an expanded BSN space in the RLC/MAC header. The expanded BSN space includes one or more redefined bits of the RLC/MAC header.

The object of the disclosure is further obtained by a computer program comprising computer program code which, when executed in a mobile station, causes the mobile station to process radio link control, RLC, blocks, of an extended sequence number space, SNS, and extended transmit window size, WS. The RLC blocks are indexed in one or more BSN fields of an expanded BSN space, wherein the expanded BSN space is provided according to any of the various method aspects disclosed above.

The object of the disclosure is further obtained by a computer program comprising computer program code which, when executed in a base station subsystem causes the base station subsystem to process radio link control, RLC, blocks of an extended sequence number space, SNS, and extended transmit window size, WS. The RLC blocks are indexed in one or more BSN fields of an expanded BSN space, wherein the expanded BSN space is provided according to any of the various method aspects disclosed above.

Embodiments of the invention are described with reference to the drawings, such as block diagrams and/or flowcharts. It is understood that several blocks of the block diagrams and/or flowchart illustrations, and combinations of blocks in the block diagrams and/or flowchart illustrations, can be implemented by computer program instructions. Such computer program instructions may be provided to a processor of a general purpose computer, a special purpose computer and/or other programmable data processing apparatus to produce a machine, such that the instructions, which execute via the processor of the computer and/or other programmable data processing apparatus, create means for implementing the functions/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks.

In some implementations, the functions or steps noted in the blocks may occur out of the order noted in the operational illustrations. For example, two blocks shown in succession may in fact be executed substantially concurrently or the blocks may sometimes be executed in the reverse order, depending upon the functionality/acts involved.

In the drawings and specification, there have been disclosed exemplary embodiments of the invention. However, many variations and modifications can be made to these embodiments without substantially departing from the principles of the present invention. Accordingly, although specific terms are employed, they are used in a generic and descriptive sense only and not for purposes of limitation.

The invention is not limited to the examples of embodiments described above and shown in the drawings.

The invention claimed is:

1. A method performed in a base station subsystem, BSS, for transmission of radio link control, RLC, blocks in an extended sequence number space, SNS, and extended transmit window size, WS on multiple downlink carriers, wherein an RLC/Medium Access Control, MAC, header of an RLC block has a fixed number of bits and comprises multiple control fields, and wherein a number of bits of the RLC/MAC header comprises a block sequence number, BSN, space, the BSN space comprising at least one BSN field, each BSN field including a respective BSN index, the method comprising:

selecting one or more spare bits in the RLC/MAC header;
    indexing each RLC block with a BSN index selected from a range of block indices representing an extended sequence number space, SNS, and extended transmit window size, WS, wherein the BSN index is included in a BSN field of an expanded BSN space including the selected one or more spare bits; and re-arranging pre-existing BSN fields in the BSN space by expanding a first BSN field used for a first BSN index and reducing further pre-existing BSN fields in the BSN space.

2. The method of claim 1, wherein the one or more spare bits in the RLC/MAC header are released from said one or more multiple control fields by:

selecting one or more of the multiple control fields based on a current functionality of the one or more control fields; and redefining the selected one or more of the multiple control fields to a reduced number of bits, such that said one or more spare bits are released from one or more redefined control fields.

3. The method according to claim 2, wherein a redefined control field is a power reduction field, and wherein the power reduction field is redefined to indicate one of two power reduction levels.

4. The method according to claim 2, wherein a redefined control field is a Relative Reserved Block Period, RRBP, field indicating a reserved block for a response by a mobile station, MS, and wherein the RRBP field is redefined to allow one of two options for the reserved block.

5. The method according to claim 2, wherein a redefined control field is a Combined EGPRS Supplementary/Polling Field, CES/P, field used when Fast Acknowledgement ACK/Negative Acknowledgement NACK reporting, FANR, operation is enabled to request feedback from a mobile station, MS, regarding ACK/NACK information and/or measurement reports, and wherein the CES/P field is redefined to allow selection of one of four options for the poll response time and ACK/NACK reporting type.

6. The method of claim 1, wherein the one or more spare bits in the RLC/MAC header are released from said one or more multiple control fields by:

selecting one or more of the multiple control fields based on a current functionality of the one or more control fields; and releasing bits of the selected one or more control fields from current functionality, such that the functionality of the respective control field is abandoned and the released one or more bits constitute the one or more spare bits.

7. The method of claim 1, wherein the expanded BSN space is used to expand the first BSN field for the first BSN index in the RLC/MAC header.

8. The method of claim 7, wherein a subset of 12 bits of the expanded BSN space is used for the first BSN field in the RLC/MAC header.

9. The method of claim 7, wherein one or more further subsets of the bits of the expanded BSN space are used for expanding respective further BSN fields in the RLC/MAC header.

10. The method of claim 1, wherein the first BSN index is an absolute BSN index related to the sequence number space, SNS, and one or more further BSN indices in the same RLC block is related to the first BSN index.

11. A mobile station in a wireless communication network, the mobile station comprising:
a receive apparatus,
a transmit apparatus,
a memory apparatus, and
a control processor that executes computer program code residing in the memory apparatus,
wherein the control processor is configured to acknowledge receipt of RLC blocks in an acknowledgment transmitted through the transmit apparatus, the RLC blocks received via the receive apparatus in an extended sequence number space, SNS, and extended transmit window size, WS, the acknowledgment including one or more BSN indices received in respective BSN fields of an expanded BSN space in a RLC/MAC header,
wherein the control processor is further configured to re-arrange the BSN fields by expanding a first BSN field used for a first BSN and further pre-existing BSN fields are reduced in the BSN space,
wherein the expanded BSN space includes one or more redefined bits of the RLC/MAC header, and
wherein an upper limit of RLC blocks received prior to acknowledgment is limited by the extended transmit window size increased in correspondence with the expanded BSN space.

12. A base station subsystem in a wireless communication network, the base station subsystem, BSS, comprising:
a receive apparatus,
a transmit apparatus,
a memory apparatus, and
a control processor that executes computer program code residing in the memory apparatus,
wherein the control processor is configured to transmit through the transmit apparatus RLC blocks in an extended sequence number space, SNS, and extended transmit window size, WS, each RLC block including an RLC/MAC header comprising a BSN index selected from a range of block indices representing the extended sequence number space, SNS, and extended transmit window size, WS,
wherein the BSN index is included in a BSN field of an expanded BSN space in the RLC/MAC header, wherein the expanded BSN space includes one or more redefined bits of the RLC/MAC header, and
wherein the control processor is further configured to re-arrange the BSN fields by expanding a first BSN field used for a first BSN and further pre-existing BSN fields are reduced in the BSN space.

* * * * *